INVENTOR.
FRANK L. CHRISTENSEN
BY
Bernard Kriegel
ATTORNEY.

United States Patent Office 3,301,941
Patented Jan. 31, 1967

3,301,941
ELECTRIC WIRE JUNCTION
Frank L. Christensen, Saratoga, Calif., assignor to Tempress Research Co., Sunnyvale, Calif., a corporation of Utah
Filed Mar. 31, 1964, Ser. No. 356,285
6 Claims. (Cl. 174—88)

The present invention relates to the connection of electric wires, and the like, to one another.

An object of the invention is to provide a junction between electric wires, and the like, in which mechanical pulls and other types of stresses that might otherwise tend to disrupt the electric connections are prevented from being transferred through the electric wires themselves at their point of interconnection.

Another object of the invention is to provide an electric wire junction which can be made in a small size, and still possess comparatively large mechanical strength, low electrical resistance, and high temperature resistance.

An additional object of the invention is to provide a junction between electric wires, and the like, in which good electric connection between adjacent wires, appropriate insulation of the connection, and its protection are secured essentially through mechanically attaching the parts to one another.

This invention possesses many other advantages and has other objects which may be made more clearly apparent from a consideration of a form embodying the invention. This form is shown and described in the present specification and drawings accompanying and constituting a part thereof. They will now be described in detail, for the purpose of illustrating the general principles of the invention; but it is to be understood that such detailed description is not to be taken in a limiting sense, since the scope of the invention is best defined by the appended claims.

Referring to the drawings.

Figure 1:
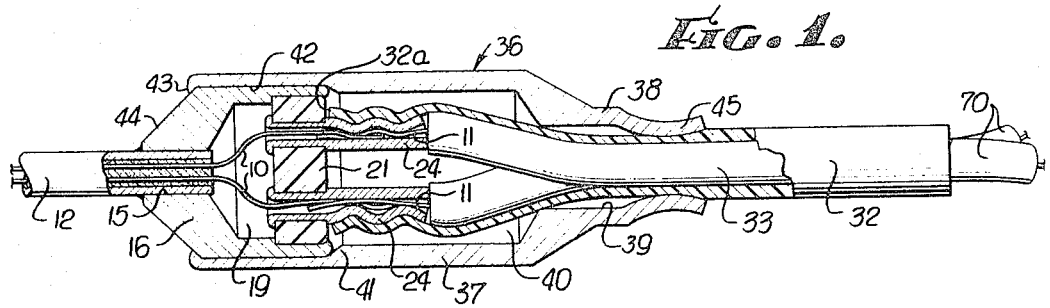
FIGURE 1 is a longitudinal section, portions being shown in side elevation, of an electric wire junction embodying the invention.

The electric junction illustrated in FIG. 1 provides electric connections between the wires 10, 10 of an electric resistance type of heater and the wires 11, 11 of insulated electric conductors 70 running from a suitable source of current, which is to flow through the resistance heater. As specifically shown, the heater wires 10 are disposed within a stainless steel sheath or tube 12 and are surrounded by insulating material 13 within the sheath or tube, which material may be magnesium oxide. The heater wires 10 project beyond the terminal or end portion 14 of the stainless steel sheath, which is piloted within a companion central passage 15 through the base portion 16 of a terminal cup 17 which, for example, may be made of stainless steel. This cup has a skirt portion 18 extending forwardly from its base portion, there being a cavity 19 in the cup through which the heater wires 10 can pass. The cavity opens into a counterbore 20 in which an insulated spacer member or supporting washer 21 is disposed, which may be made of electrical insulation material, such as a suitable ceramic material. This washer engages a shoulder or base 22 of the counterbore and is held in assembled position against the shoulder by rolling over or flanging inwardly the terminal portion 23 of the cup skirt 18.

Mounted within the insulated support member 21 are a pair of longitudinally extending and laterally spaced conductive terminal tubes 24, which may be made of nickel or nickel-like material. Each of these tubes has a reduced diameter portion 25 extending within a companion longitudinal passage or bore 26 in the insulated washer, a shoulder 27 on each tube engaging the outer surface of the washer. The inner end of each tube is riveted or flared outwardly to provide a flange 28 engaging the inner surface of the insulated washer, as well as a flaring mouth 29 through which a heater wire 10 can be inserted into the bore or passage 30 in the tube.

The terminal portion of each heater wire is disposed within the cavity 19 and also into the bore 30 of an associated tube 24. Similarly, the terminal portion 11 of each lead wire is inserted into the tube 24 through its opposite end, and may overlie or be disposed adjacent to an associated heater wire 10. The electrically conductive terminal tube 24 is crimped or flattened laterally so that its crimped or flattened portion 31 clamps both the heater wire terminal 10 and the lead wire terminal 11 firmly to the tube, forming a good electrical connection between the heater wire and the lead wire, which may be provided by direct contact of the wires 10, 11 with one another, or by good mechanical contact between the heater wire 10 and tube 24 and the tube 24 and the lead wire 11, or by a combination of the aforementioned types of contact.

The crimped tubes 24 are covered by a flexible tubing 32 of insulating material which, for example, may be a vinyl resin, the tubing extending along a substantial length of the insulated portions 33 of the electric conductors 70, the inner end 32a of the insulated vinyl tubing terminating closely adjacent to the insulated washer or support 21.

A secure attaching of the terminal cup 17 to the stainless steel sheath 12 is obtained, as by use of silver brazing material 35 integrating the base portion 16 of the cup with the periphery of the stainless steel sheath or tube.

A jacket or housing 36 encloses the terminal cup 17, insulated washer 21, terminal tubes 24, lead wires 11, and a portion of the insulating tube 32, and serves to mechanically interconnect the insulated conductor members 70 and insulated tubing 32 with the terminal cup. As disclosed in FIG. 1, the jacket or housing 36 includes a main body portion 37 of relatively large diameter and a tail portion 38 of substantially smaller diameter, the tail portion having a passage 39 therethrough adapted to receive the insulated conductor wires 70 and the insulated tubing 32. Forwardly of its tail portion 38, the jacket provides a chamber 40 larger than the lateral dimension of the insulating tubing 32 mounted on the terminal tubes 24, this chamber terminating in a shoulder 41 adapted to abut the forward end 23 of the terminal cup 17. This shoulder merges into an enlarged diameter jacket portion 42 adapted to snugly fit over the periphery of the terminal cup skirt 18. With the shoulder 41 engaging the forward end 23 of the terminal cup, the end of the jacket extends slightly beyond the cylindrical periphery of the cup, the end portion 43 of the jacket being rolled or flanged over in an inward direction against the tapered transverse surface 44 of the cup base 16, so as to firmly secure the jacket to the cup. Part 45 of the tail portion of the jacket is then flattened or crimped inwardly to compress it against the insulating tubing 32 at a location substantially spaced from the terminal tubes 24, the insulating tubing 32 also being flattened to some extent against the insulation or sheath 33 of the conductive wires 70.

Figure 2:
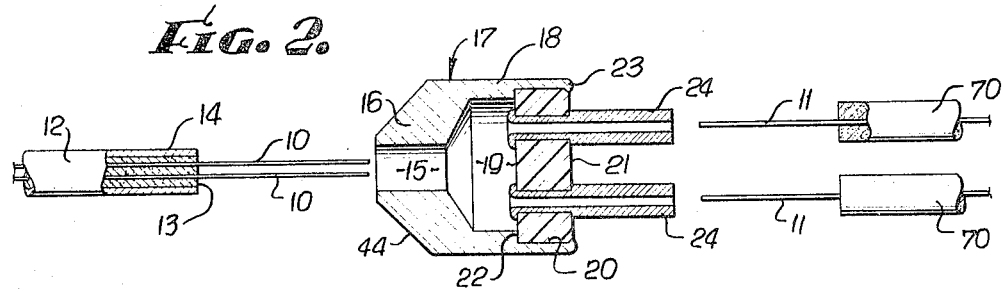
FIG. 2 is a longitudinal section, parts shown in side elevation, illustrating the initial steps in making the electric junction disclosed in FIG. 1.

In the manufacture of the electric wire junction illustrated in FIG. 1, the terminal tubes 24 are inserted in the bores 26 of the insulated washer 21 and their rear ends 28 then riveted or flared over. The washer and tube subassembly is then inserted in the counterbore 20 of the terminal cup 17 and the forward end 23 of the latter flared over the end of the insulated washer to secure the washer to the terminal cup (FIG. 2). The stainless steel sheath 12 with a pair of heater wires 10 projecting from its forward end is then inserted in the central passage 15 of the cup, each of the heater wires 10 being disposed in its associated bore or passage 30 in a terminal tube 24, after which the terminal cup 17 is secured to the stainless steel tube 12 by silver brazing material 35 disposed between the end of the terminal cup and the periphery of the stainless steel tube.

Figure 3:
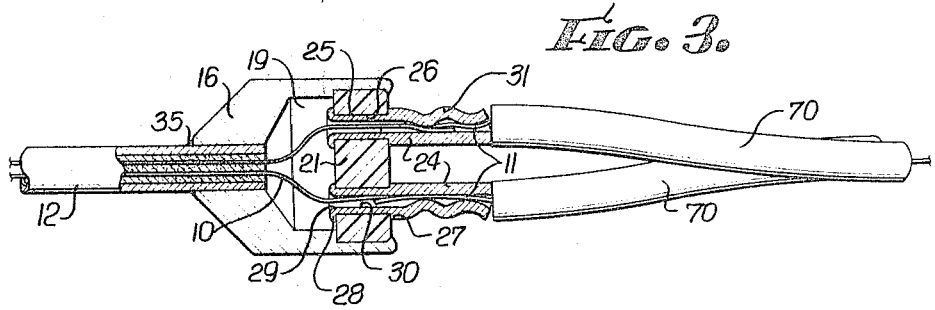
FIG. 3 is a view similar to FIG. 2, illustrating additional steps in forming the electric wire junction.
Figure 4:
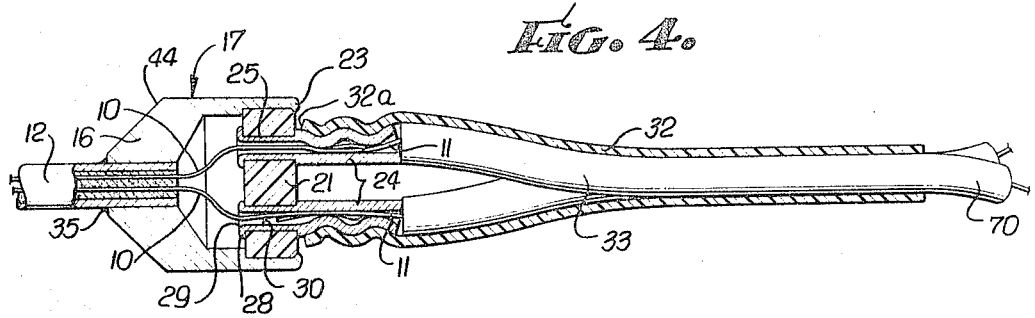
FIG. 4 is a view similar to FIGS. 2 and 3 illustrating yet a further step in manufacturing the electric wire junction disclosed in FIG. 1.

The exposed lead wires 11 of the pair of conductor members 70 are then each located in its associate bore 30 of a terminal tube 24, with the insulation 33 substantially abutting the outer end of the tube 24, each tube then being crimped or flattened inwardly to mechanically connect the conducting tube 24 with the heater wire 10 and the lead wire 11 disposed in its bore, as disclosed in FIG. 3. The tubing 32 of insulating material is then pulled over the conductive wires 70 and is stretched over the terminal cup 17, the vinyl tubing 32 conforming to the flattened or crimped portions 31 of the tubes, thereby insulating the tubes 24 and preventing external contact therewith by other conducting elements. The partially completed junction assembly is then in the condition illustrated in FIG. 4.

The jacket or housing 36 is then moved over the insulated tubing 32 and the conductor members 70 therewithin, and is shifted over the periphery of the terminal cup 17, until its shoulder 41 engages the end 23 of the cup, the end 43 of the jacket then being rolled or flanged inwardly to engage the tapered end portion 44 of the terminal cup. The tail portion 45 of the jacket is then flattened or crimped inwardly to mechanically secure it to the insulated tubing 32 and to the insulated conductors 70. The entire assembly has thus been completed, being illustrated in FIG. 1.

The electric wire junction illustrated in FIG. 1 prevents mechanical stresses from being imposed upon the connection between each heater wire 10 and its associated lead wire 10 with a tube 24. Any mechanical pulls or other strains imposed on the heater tube 12 or on the electric conductors 70 are transferred through the rigid cup 17 and rigid jacket 36, and do not pass through the junction portions of the wires themselves. Lateral bending or other forces imposed upon the jacket or housing 36 are not transmitted to the wires within the terminal tubes 24, but are resisted by the jacket or housing. The same is true of compressive forces imposed upon the parts. Any longitudinally inwardly directed forces on the conductors 70 or the insulated tubing 32 are transmitted through the crimped or flattened portion 45 of the jacket to the jacket 36, and through its shoulder 41, terminal cup 17, and the silver brazing material 35 to the stainless steel tubing 12. Inwardly directive or compressive forces originating from the heater end of the apparatus is transmitted in a reverse direction through the cup 17 and housing 36 to the insulated tubing 32 and the conductors 70. The stresses themselves are not transmitted through the electrical connecting portions between each heater wire and its associated lead wire.

The above connection has been found to possess great mechanical strength, despite the fact the junction, and particularly its heater wires 10 and lead wires 11, are of a relatively small size. The large conductive areas between the heater wires and lead wires and each terminal tube 24 result in very low electrical resistance at the connecting points. The particular connection also enables it to resist high temperatures, such as might be due to conductive flow of heat from the heater wires 10 to the junction. Substantially all contacts are mechanical. The only nonmechanical connection is the silver brazing connection 35 between the cup 17 and the stainless steel heater tube 12.

The entire assembly is made of parts that are compartively simple, being capable of manufacture on screw machines, or of being molded easily. The assembly of the parts to one another is rapid and inexpensive, particularly in view of their mechanical interconnection. Even the silver brazing of the terminal cup to the heater tube 12 is effected in a rapid manner. The simplicity of the parts and their essentially mechanical interconnection to one another makes the assembly of the complete junction capable of accomplishment in a rapid and relatively simple manner. Despite the relative low cost of making the junction, it possesses great mechanical strength and has a long life, since electrical contact between the lead wires 11 and the heater wires 10 is retained, not being susceptible to disruption because of transfer or bypassing stresses around the electrical contact location. The electrically conducting parts are fully insulated from one another, minimizing the danger of short-circuiting.

I claim:

1. In an electric wire junction: a terminal member having a passage; an insulated support in said member; a conductive tube secured to said support; a first sheath in said passage secured to said terminal member; a first electrical conductor extending from said sheath and disposed in said tube from one end thereof; a second sheath adjacent to said tube and having a second electrical conductor extending therefrom and disposed in said tube from the opposite end thereof; said tube being mechanically connected to the portions of said first and second electrical conductors disposed therein; insulating means disposed over said tube; and a jacket surrounding said terminal member, tube and second sheath and secured to said terminal member and second sheath to transmit mechanical forces between said first sheath and second sheath.

2. In an electric wire junction; a terminal member having a passage; an insulated support in said member; a conductive tube secured to said support; a first sheath in said passage secured to said terminal member; a first electrical conductor extending from said sheath and disposed in said tube from one end thereof; a second sheath adjacent to said tube and having a second electrical conductor extending therefrom and disposed in said tube from the opposite end thereof; said tube being pressed inwardly to connect it to the portions of said first and second electrical conductors disposed therein; an insulating tube disposed over said tube and second sheath; and a jacket surrounding said terminal member, tube and insulating tubing and secured to said terminal member, said jacket being pressed inwardly against said tubing to press said tubing inwardly against said second sheath, whereby mechanical forces are transmittable between said sheaths without passing through the portions of said first and second conductors disposed in said tube.

3. In an electric wire junction: a terminal cup having a central passage; an insulated support within and secured to said cup; a conductive tube secured to said support; a first sheath in said passage secured to said cup; a first electrical conductor extending from said sheath and disposed in said tube from one end thereof; a second sheath adjacent to said tube and having a second electrical conductor extending therefrom and disposed in said tube from the opposite end thereof; said tube being pressed laterally inwardly to conect it to the portions of said first and second electrical conductors disposed therein; an insulating tubing disposed over said tube and second sheath; and a jacket surrounding said cup, tube and insulating tubing, said jacket having a thrust shoulder engaging an end of said cup remote from said passage to transmit longitudinal forces in one direction between said jacket and cup, said jacket having an inwardly directed flange engaging another portion of said cup to transmit longitudinal forces in the opposite direction between said jacket and cup, said jacket being pressed laterally inwardly against said tubing to press said tubing inwardly against said second sheath, whereby mechanical forces are transmittable between said sheaths without passing through the portions of said first and second conductors disposed in said tube.

4. In an electric wire junction; a terminal member having a passage; an insulated support in said member; a plurality of spaced conductive tubes secured to said support; a first sheath in said passage secured to said terminal member; a plurality of first electrical conductors extending from said sheath, each of said conductors being disposed in an associated tube from one end thereof; a plurality of other sheaths adjacent to said tubes and having electrical conductors extending therefrom and each disposed in a tube from the opposite end thereof; each of said tubes being mechanically connected to the portions of said electrical conductors disposed therein; insulating means disposed over said tubes; and a jacket surrounding said terminal member, tubes and plurality of other sheaths and secured to said terminal member and other sheaths to transmit mechanical forces between said first sheath and other sheaths.

5. In an electric wire junction; a terminal member having a passage; an insulated support in said member; a plurality of spaced conductive tubes secured to said support; a first sheath in said passage secured to said terminal member; a plurality of first electrical conductors extending from said sheath, each of said conductors being disposed in an associated tube from one end thereof; a plurality of other sheaths adjacent to said tubes and having electrical conductors extending therefrom and each disposed in a tube from the opposite end thereof; each of said tubes being pressed laterally inwardly to connect it to the portions of said electrical conductors disposed therein; an insulating tubing disposed over said tubes and said other sheaths; and a jacket surrounding said terminal member, tube and insulated tubing and secured to said terminal member, said jacket being pressed laterally inwardly against said tubing to press said tubing inwardly against said other sheaths, whereby mechanical forces are transmittable between said first sheath and said other sheaths without passing through the portions of said conductors disposed in said tubes.

6. In an electric wire junction; a rigid terminal cup having a central passage; an insulated support within and secured to said cup; spaced conductive tubes secured to said support; a first sheath in said passage secured to said cup; electrical conductors extending from said sheath, each conductor being disposed in an associated tube from one end thereof; a plurality of other sheaths adjacent to said tubes, each of said other sheaths having an electrical conductor extending therefrom and disposed in an associated tube from the opposite end thereof; each of said tubes being pressed laterally inwardly to connect it to the portions of said electrical conductors disposed therein; an insulating tubing disposed over said tubes and other sheaths; and a rigid jacket surrounding said cup, tubes and insulated tubing, said jacket having a thrust shoulder engaging an end of said cup remote from said passage to transmit longitudinal forces in one direction between said jacket and cup, said jacket having an inwardly directed flange engaging another portion of said cup to transmit longitudinal forces in the opposite direction between said jacket and cup, said jacket being pressed laterally inwardly against said tubing to press said tubing inwardly against said other sheaths, whereby mechanical forces are transmittable between said first sheath and said other sheaths without passing through the portions of said conductors disposed in said tubes.

No references cited.

LEWIS H. MYERS, *Primary Examiner.*

D. L. CLAY, *Assistant Examiner.*